E. TAYLOR.
WAGON STEP.
APPLICATION FILED JAN. 12, 1916.
1,195,869.
Patented Aug. 22, 1916.
2 SHEETS—SHEET 1.
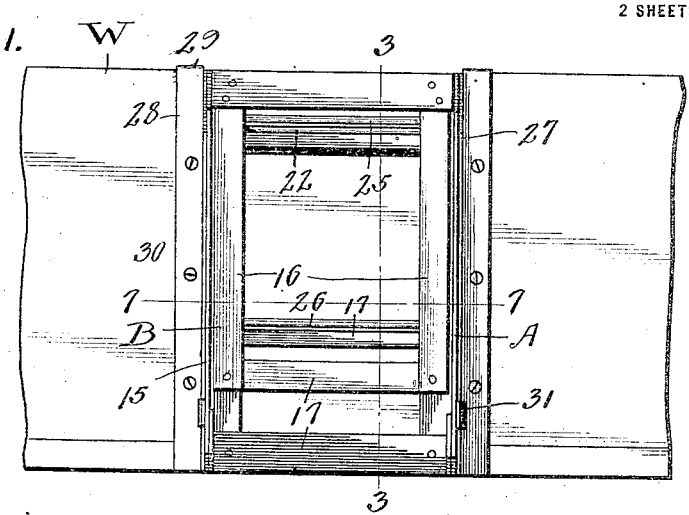
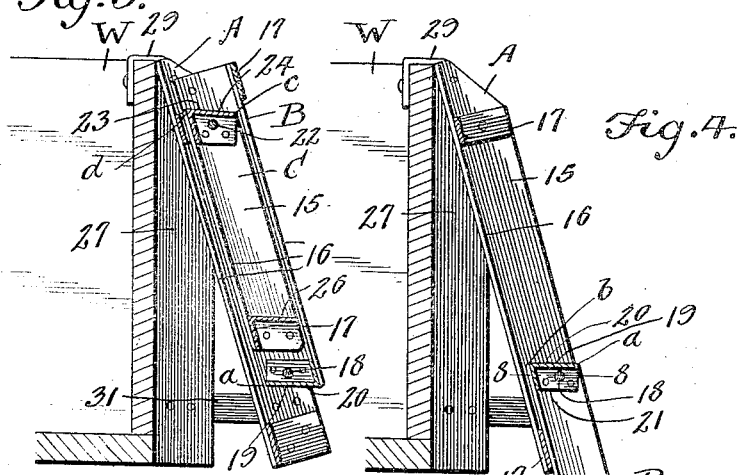
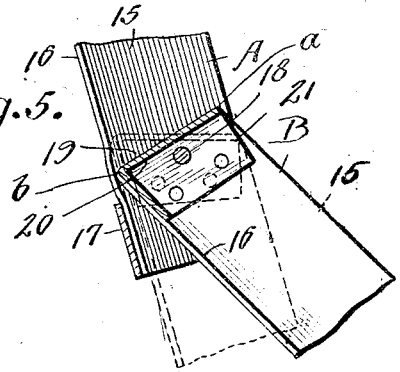
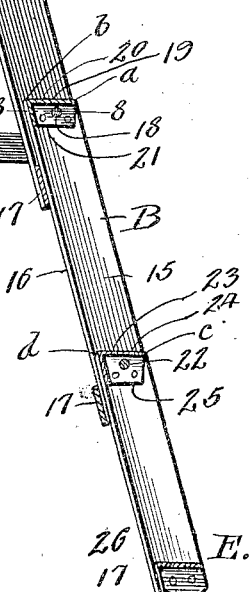
Inventor
E. Taylor,
Witnesses
By Victor J. Evans
Attorney E. TAYLOR.
WAGON STEP.
APPLICATION FILED JAN. 12, 1916.
1,195,869.
Patented Aug. 22, 1916.
2 SHEETS—SHEET 2.
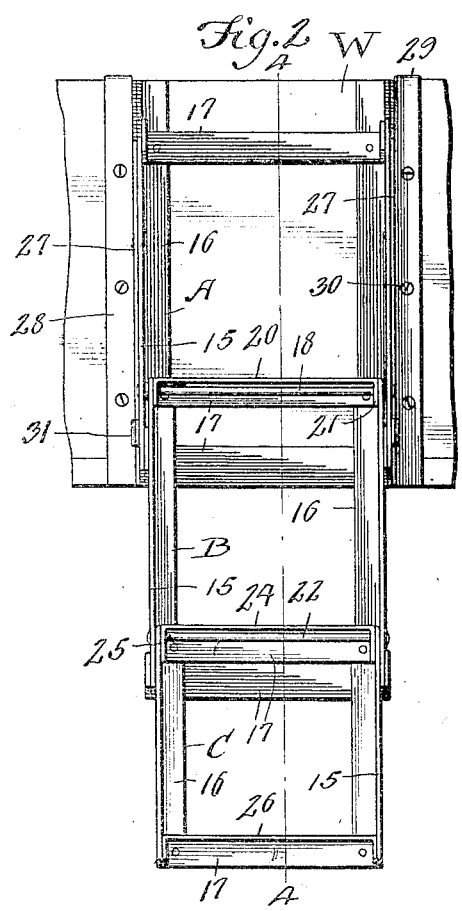
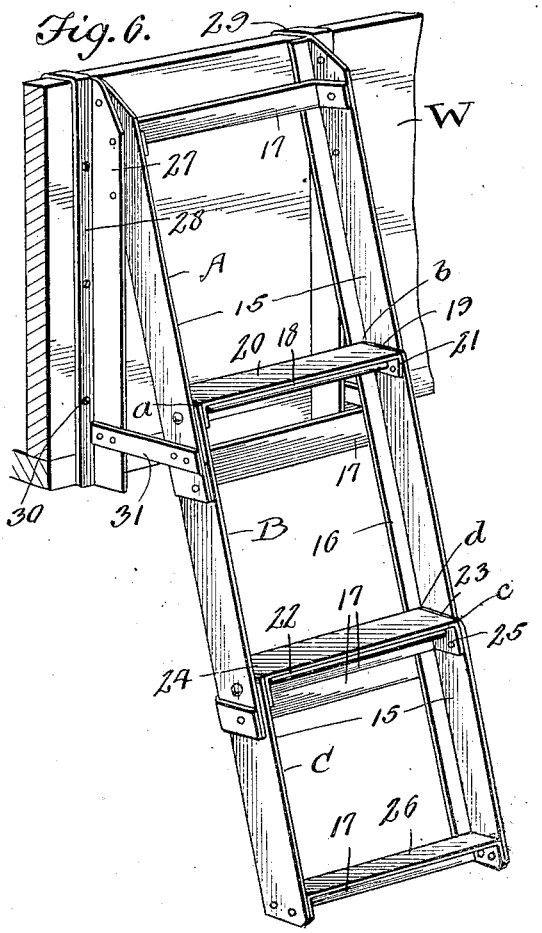
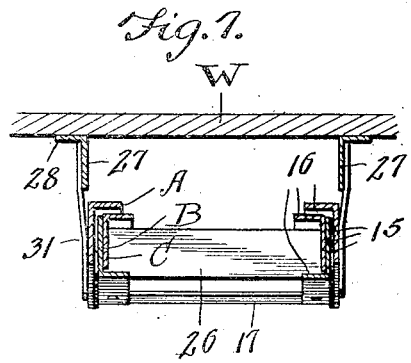
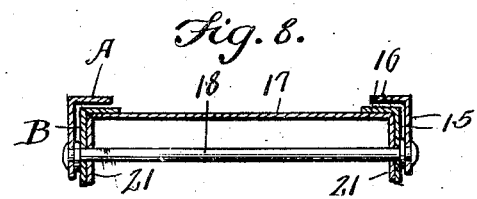
Inventor
E. Taylor,
By Victor J. Evans
Attorney
Witnesses

UNITED STATES PATENT OFFICE.

EDGAR TAYLOR, OF DEMOREST, GEORGIA.

WAGON-STEP.

1,195,869.

Specification of Letters Patent.

Patented Aug. 22, 1916.

Application filed January 12, 1916. Serial No. 71,749.

*To all whom it may concern:*

Be it known that I, EDGAR TAYLOR, a citizen of the United States, residing at Demorest, in the county of Habersham and State of Georgia, have invented new and useful Improvements in Wagon-Steps, of which the following is a specification.

This invention relates to steps for wagons and other vehicles, and it has for its object to produce a folding step of simple and improved construction.

A further object of the invention is to produce a folding step which may be readily secured or mounted upon the side of a wagon where it will be retained in folded or unfolded condition, as may be desired.

A further object of the invention is to produce a wagon step composed of a plurality of sections foldably connected together, the said sections being so constructed that certain parts thereof will coact to produce resilient locking devices whereby the parts will be retained in folded or unfolded condition, as may be desired, but it may be folded or unfolded by the exertion of sufficient power to overcome the resistance of the resilient locking parts.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—Figure 1 is a side view showing a portion of a wagon box, to the side of which the improved step has been applied, the same being shown in folded condition. Fig. 2 is a similar view showing the step unfolded. Fig. 3 is a vertical sectional view taken on the line 3—3 in Fig. 1. Fig. 4 is a sectional view taken on the line 4—4 in Fig. 2. Fig. 5 is a vertical sectional view showing the step partly unfolded to illustrate the operation of the locking device. Fig. 6 is a perspective view showing the step unfolded. Fig. 7 is a transverse sectional view taken on the line 7—7 in Fig. 1, Fig. 8 is a transverse sectional view taken on the line 8—8 in Fig. 4.

Corresponding parts in the several figures are denoted by like characters of reference.

The improved step or ladder, as it might be termed, is composed of a plurality of sections hingedly connected together so as to be capable of folding in small compass. In the accompanying drawings a device composed of three such sections has been shown, namely, a top section A, intermediate section B and a bottom section C, but it will be understood that the principle of the invention may be applied to devices having two or more sections. The device is preferably constructed of sheet metal, such as iron or steel, of sufficient thickness to provide the necessary strength and rigidity. Each of the parts or sections is composed of side rails or side members 15 having laterally extending flanges 16. The side rails or members of each of the several sections are connected together and spaced apart by means including brace members 17 that lie flatwise on the flanges 16 so as not to interfere with the folding together of the several sections, one within another, the parts being so proportioned and arranged that the side rails of the middle section B will lie adjacent to the inner faces of the side rails of the top-section A, while the side rails of the bottom section C will lie adjacent to the inner faces of the side rails of the middle section. By properly proportioning the length of the respective side rails, it will be seen that the section C may be accommodated between the side rails of the section B, while the latter, including the section C, may be accommodated between the side rails of the section A. When additional sections are used, the same principle will be carried out, but as a rule three sections will be found sufficient.

The section B is hingedly connected with the section A by means of a rod or bolt 18 which extends transversely through the body portions of the respective side rails and the axis of which is disposed midway between the front and rear edges of the respective side rails, or approximately so. The side rails of the section B are cut off obliquely, as seen at 19, to support a step 20 having downturned flanges 21 at the ends thereof which are riveted on the inner faces of the side rails of the middle section and which are apertured for the passage of the connecting rod or hinge member 18. The step 20 may also be formed integrally with one of the brace members 17, and it has been so shown in the drawings. The corners *a* and *b* produced by the intersection of the oblique edges 19 with the front and rear edges of the side members of the section B will obviously be so spaced from the axis of the bolt or connecting rod 18 that when the section B is folded or unfolded with respect to the section A one or the other of said corners will frictionally engage the flanges 16 of the side members of the said top section A, said flanges being understood to possess sufficient inherent resiliency to permit them to yield to the exertion of sufficient pressure to enable the folding or unfolding of the section B to be effected. When folded or unfolded the respective parts will be retained in proper position until sufficient force is exerted to depress the flanges of the side members of the section A against the pressure exerted thereagainst by the corners *a* and *b* of the section B, thereby causing the parts to be retained in proper position without the use of separate or special fastening devices.

In like manner, the bottom section C is connected with the middle section B by means of a pivotal connecting rod or bolt 22. The side members of the section C are cut off obliquely, as seen at 23, and are connected together by a step 24 having downturned flanges 25 which are riveted on the inner faces of the side members of the section C, said flanges being apertured for the passage of the connecting member 22. The corners *c* and *d* at the front and rear edges of the side members of the section C are adapted to frictionally engage the inherently resilient flanges 16 of the side members of the section B, depressing said side members to form a locking device. The step 24 may be integral with one of the brace members 17. The side members of the bottom section are also connected together at their lower ends by an additional step 26 which constitutes the bottom step of the ladder when unfolded, and which bottom step may also be integral with one of the brace members 17.

The top section A of the device is connected with supporting members 27 which are provided with outwardly extending flanges 28 having terminal hooks 29 at their upper ends to engage the top edge of a wagon box W on the side of which the device may be additionally secured by fastening members, such as screws or bolts 30, extending through the flanges 28. The side members of the top section are obliquely disposed with respect to the supporting members 27, the lower ends of the side members of the top section being spaced from the supporting members 27 by brace members 31, so that the top section A will be disposed in a downwardly and outwardly inclined position with respect to the wagon box. This inclined position will be preserved by the lower sections B and C when unfolded, owing to the persence of the brace members 17 which are disposed flatwise on the flanges 16 of the side members of the respective sections, as well as by the presence of the flanges 16 which will prevent the unfolding of any of the sections beyond the respective planes of said flanges.

From the foregoing description, taken in connection with the drawings hereto annexed, it will be seen that I have produced a folding ladder or wagon step of very simple and efficient construction which may be manufactured at a moderate expense and which when applied to an ordinary wagon will enable access to be had thereto more readily and conveniently than by the use of portable devices; an important advantage of the present device being that the sections thereof whether folded or unfolded will be retained in proper position without the use of special locks or fastening devices.

Having thus described the invention, what is claimed as new, is:—

1. In a device of the class described, a pair of sections each comprising side rails having laterally extending inherently resilient flanges, and a hinge member consisting of a rod extending through the side members of the respective sections, the parts being so proportioned and arranged that the flanges of the side members of one section will be located in the path of the corners of the side members of the other section when the latter is folded about the axis of the pivotal connecting member.

2. In a device of the class described, a pair of sections each comprising side rails having laterally extending inherently resilient flanges, and a hinge member consisting of a rod extending through the side members of the respective sections, the edges of the side members of one section being cut off obliquely near the pivotal connecting member to produce corners that will forcibly contact with the inherently resilient flanges of the side members of the other section when folded about the axis of the pivotal connecting member.

3. In a device of the class described, a plurality of sections each comprising side members having laterally extending inherently resilient flanges, and means including braces lying flatwise on the laterally extending flanges whereby the side members of the respective sections are connected and spaced apart, and pivotal members extending through the side members of the respective sections whereby said sections are hingedly connected together, the parts being so arranged and proportioned that the flanges of the side members of one section will be located in the path of the corners of the side members of the next subjacent section to be forcibly depressed thereby when the sections are folded or unfolded.

4. In a device of the class described, a plurality of sections each comprising side members having laterally extending inherently resilient flanges, and means including braces lying flatwise on the laterally extending flanges whereby the side members of the respective sections are connected and spaced apart, and pivotal members extending through the side members of the respective sections whereby said sections are hingedly connected together, the parts being so arranged and proportioned that the flanges of the side members of one section will be located in the path of the corners of the side members of the next subjacent section to be forcibly depressed thereby when the sections are folded or unfolded; some of said sections being provided with steps having downturned flanges secured on the inner faces of the side members thereof to assist in connecting and spacing said side members.

5. In a device of the class described, a plurality of sections each comprising side members having laterally extending flanges, said side members being connected and spaced apart, pivot members extending through the side members of the respective sections and whereby said sections are hingedly connected together, some of said sections being provided with steps whereby the side members thereof are also connected and spaced apart, supporting members secured externally on the side members of the topmost section, said supporting members having laterally extending flanges with terminal hooks at their upper ends, and braces whereby the lower ends of the side members of the top section are rigidly connected with and spaced from the supporting members with relation to which the said top section is thus secured in a downwardly and outwardly inclined position, each section being foldable between the side members of the section next above and the folding movement being limited by the laterally extending flanges of such side members.

In testimony whereof I affix my signature in presence of two witnesses.

EDGAR TAYLOR.

Witnesses:
 HENRY REED,
 RONA SPENCER.